United States Patent [19]

Jannard

[11] Patent Number: 5,550,599
[45] Date of Patent: Aug. 27, 1996

[54] SURFACE MODIFIED LENS

[75] Inventor: James H. Jannard, Eastsound, Wash.

[73] Assignee: Oakley, Inc., Irvine, Calif.

[21] Appl. No.: 179,092

[22] Filed: Jan. 10, 1994

[51] Int. Cl.$^6$ .............................. G02C 7/02; G02C 7/16
[52] U.S. Cl. .............................. 351/159; 351/45; 351/46; 351/177
[58] Field of Search .................... 351/158, 159, 351/163, 164, 165, 41, 44, 45, 46, 51, 177

[56] References Cited

U.S. PATENT DOCUMENTS

| 564,894 | 7/1986 | Kokinski | 351/45 |
|---|---|---|---|
| 1,637,406 | 8/1927 | Brumder | 351/45 |
| 1,802,424 | 4/1931 | Hitchiner | 351/45 |
| 1,882,909 | 10/1932 | Rhue | 351/45 |
| 2,015,241 | 9/1935 | Singer | 351/45 |
| 2,021,381 | 11/1935 | Reh | 351/45 |
| 2,043,840 | 6/1936 | Singer | 351/45 |
| 3,526,449 | 9/1970 | Bolle' et al. | 351/41 |
| 3,791,722 | 2/1974 | Ahlberg et al. | 351/45 |
| 4,338,003 | 7/1982 | Adrian | 351/44 |
| 4,715,702 | 12/1987 | Dillon | 351/44 |
| 4,780,103 | 10/1988 | Minowa | 351/165 |
| 5,208,614 | 5/1993 | Jannard | 351/41 |

FOREIGN PATENT DOCUMENTS

| 0013867 | 8/1980 | European Pat. Off. . |
|---|---|---|
| 790755 | 5/1935 | France . |
| 2451900 | 4/1979 | France . |
| 2576117 | 1/1985 | France . |
| 2617294 | 6/1988 | France . |
| 2626683 | 2/1989 | France . |
| 2052430 | 5/1972 | Germany . |
| 101517 | 6/1985 | Japan . |
| 249768 | 4/1926 | United Kingdom . |
| 265379 | 2/1927 | United Kingdom . |
| 268942 | 4/1927 | United Kingdom . |
| 272825 | 6/1927 | United Kingdom . |
| 429338 | 5/1935 | United Kingdom . |
| 600726 | 10/1944 | United Kingdom . |
| 1284213 | 8/1972 | United Kingdom . |
| 1603751 | 11/1981 | United Kingdom . |

*Primary Examiner*—Scott J. Sugarman
*Attorney, Agent, or Firm*—Knobbe, Martens, Olson & Bear

[57] ABSTRACT

Disclosed is a lens for eyeglasses having at least one optical zone and at least one peripheral zone. At least a portion of the surface of the lens in the peripheral zone is modified such as by the removal of lens material or the addition of material to the surface of the lens. The lens may extend throughout the wearer's entire angular range of vision. In another embodiment of the present invention, independent surface modified lenses are placed in the wearer's left and right fields of vision.

12 Claims, 8 Drawing Sheets

SURFACE MODIFIED LENS

BACKGROUND OF THE INVENTION

The present invention relates to eyewear, and, in particular, to a surface modified lens system for eyeglasses.

Conventional eyeglass lenses, through a combination of construction material and geometry, tend to be somewhat inflexible and brittle. A brittle lens is susceptible to breakage when contacted by flying debris, such as stones or ice. In addition, lenses exhibiting relatively low flexibility are subject to breakage upon impact of the type encountered during active sports. These problems are particularly encountered with unitary lens systems.

Flexibility has been increased in the prior art by such modifications as reducing lens thickness or selecting more flexible lens materials. However, these alternatives generally sacrifice optical clarity, which must be optimized for eyeglasses intended for use during high speed activities.

Moreover, a relatively high level of static electricity tends to accumulate on the surface of conventional unitary lenses. A static electricity charge tends to attract and retain particulates, such as dust and dirt. These particulates may obstruct or blur the wearer's field of vision and therefore are undesirable.

A further disadvantage of certain conventional eyeglass lens systems is the inability of those systems to adequately intercept peripheral light, such as glare from a ski slope, water surface, or elsewhere. The provision of a conventional eyeglass frame can assist interception of certain peripheral light, but the frame adds additional weight to the eyewear product.

Notwithstanding the wide range of eyeglass lenses available for recreational and competitive use, there remains a need for a specialty lens having an aesthetically pleasing frameless peripheral zone with a modified surface such as to intercept light in the peripheral regions of the lens surrounding the central optical zone. Optimally, the lens also has increased flexibility to minimize the risk of breakage and a reduced propensity to accumulate static electricity.

SUMMARY OF THE INVENTION

A lens system for eyeglasses is provided having at least one central optical zone and a surface modification on a peripheral zone of the lens. The surface modification reduces light transmission through the peripheral zone without impairing optical clarity through the optical zone of the lens. The surface modification may also be configured to give the visual impression that the lens has a frame, which may fully or partially surround the optical zone.

In one aspect of the present invention, there is provided a unitary lens for participation in active sporting events such as biking, skiing and the like. The exterior surface of the lens contains one or more grooves in the peripheral zone extending partway through the thickness of the lens. The lens may conform to the surface of a sphere, cylinder, cone, toroid or other geometric solid shape.

In a particular embodiment, a single groove is provided having a substantially flat bottom and sufficient width to cover the entire peripheral zone of the lens. Due to the manufacturing technique of the groove, such as etching, sandblasting or milling, the bottom of the groove assumes an etched, textured finish which tends to intercept peripheral light.

In a further embodiment of the invention, the surface modification to the lens is provided by applying an additional, particulate material to the surface of the lens. Unlike prior embodiments, in which the surface modification produces a depression from the native surface of the lens, the present embodiment produces an elevation from the native surface of the lens to produce a fogged or etched appearance. Preferably, the surface modification for this embodiment is similarly situated in the peripheral zone, which may fully or partially surround a transparent optical zone for suspension in front of the eye of the wearer.

The surface modified lens system of the present invention may be incorporated onto either a unitary lens or the individual lenses of a dual lens system. The surface modifications may be placed anywhere on the lens blank, such as to intercept peripheral light and or produce the appearance of a frame, but preferably outside of the optical zone.

DETAILED DESCRIPTION OF PREFERRED EMBODIMENTS

Figure 2:
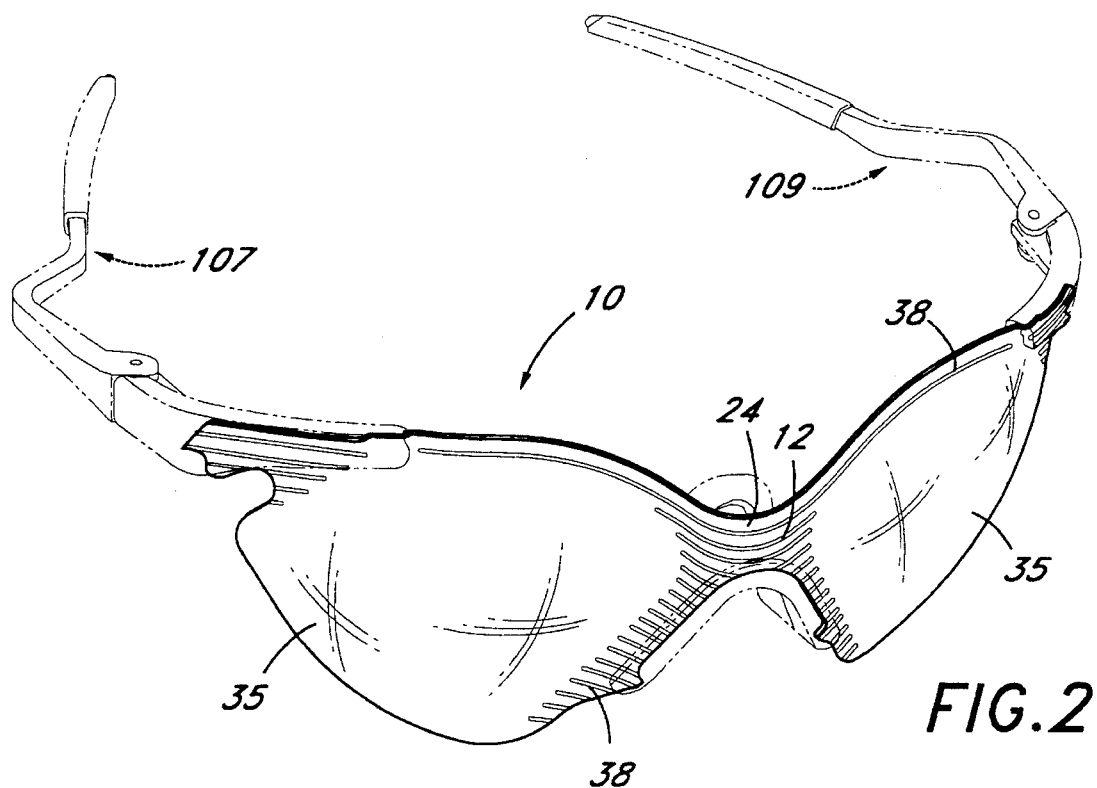
FIG. 2 is a front perspective view of the embodiment shown in FIG. 1 with a nosepiece, earstems and earstem connectors shown in phantom.
Figure 1:
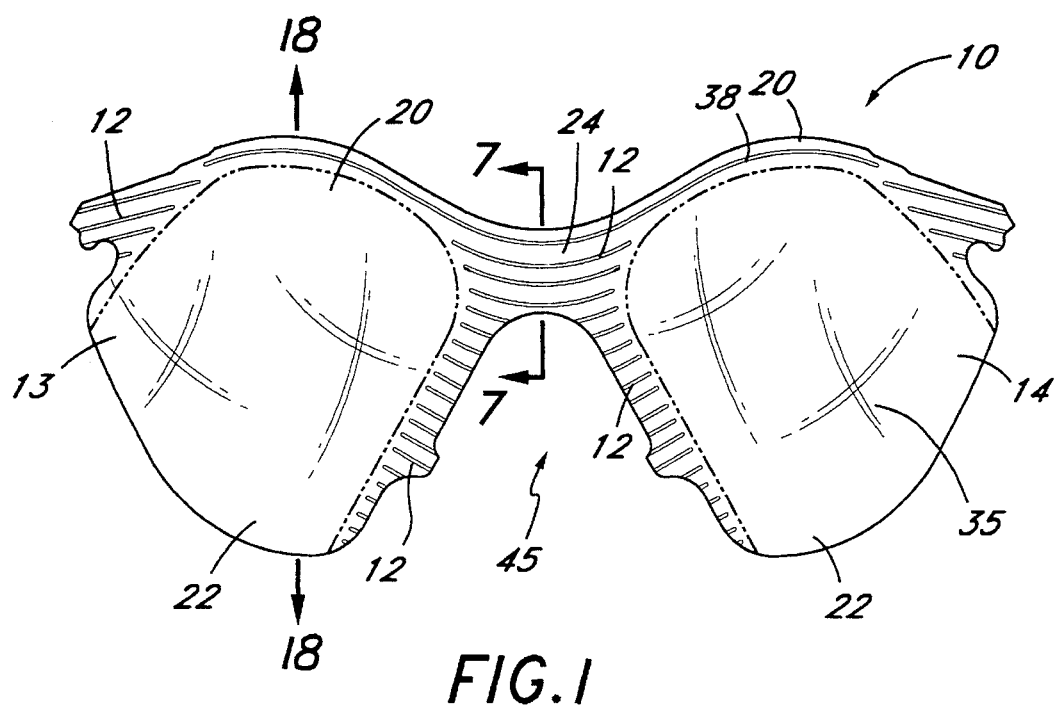
FIG. 1 is a front elevational view of a lens incorporating the grooves in accordance with the present invention.
Figure 3:
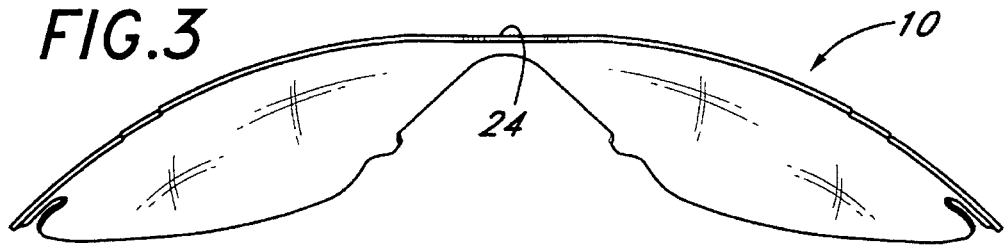
FIG. 3 is a top plan view of the lens of FIG. 1.
Figure 4:
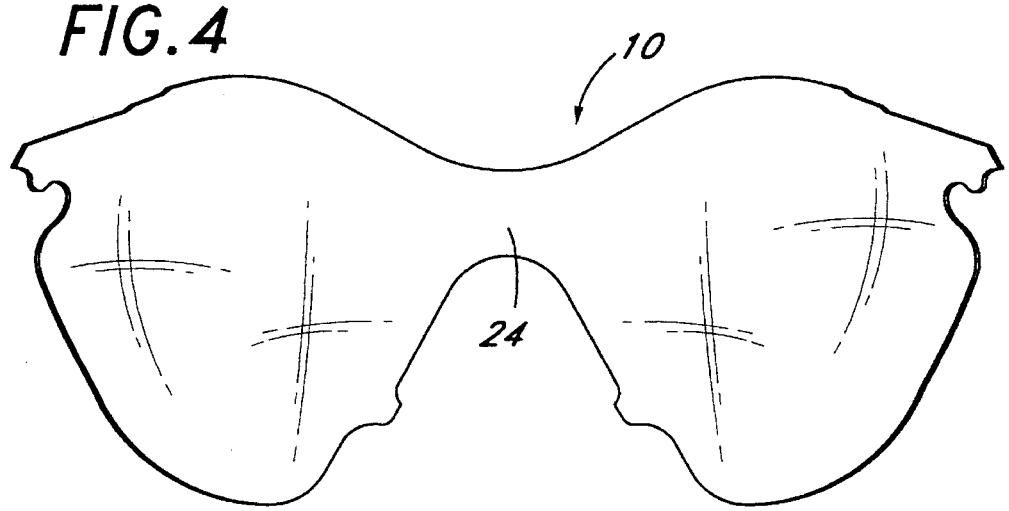
FIG. 4 is a rear elevational view of the lens of FIG. 1.

Referring to FIG. 1, there is provided in accordance with one aspect of the present invention an improved eyeglass lens 10 which overcomes or minimizes the disadvantages of the prior art discussed above, and produces an aesthetically pleasing result. In particular, the eyeglass lens 10 is provided with structural modifications in the peripheral zone 38 of the lens 10.

The structural modifications in accordance with this aspect of the invention comprise a plurality of grooves 12 on a surface of the lens 10. Preferably, the grooves 12 are provided on the convex outer surface of the lens, as illustrated. Alternatively, grooves may be placed on the inner concave surface of the lens alone, or on both the concave inner surface and convex outer surface of the lens 10.

It appears to the present inventor that the grooves 12 of the present invention may both reduce the propensity of the lens to collect a static electrical charge, and also may improve the impact resistance of the lens 10. This is believed to be accomplished by reducing the surface tension of the lens 10. In addition, the grooves of the present invention, when configured as described below, also assist in improving the flexibility of the lens so that the lens can assist in providing a medially directed bias on the earstems in certain eyewear systems. See, e.g., co-pending U.S. patent application Ser. No. 07/758,271 entitled "Improved Earstem For Eyeglasses", the disclosure of which is hereby incorporated by reference. The appearance of a frame around or adjacent the optical zone and interception of peripheral light can also be achieved by suitable placement, width and density of the grooves.

Distribution of the grooves on the surface of the lens can be varied considerably and still accomplish one or more of the objectives of the present invention. Referring to the embodiment of the present invention disclosed in FIG. 1, a plurality of grooves 12 are particularly concentrated in the bridge area 24 of the lens 10. In general, the grooves are concentrated in the peripheral zone 38, which generally includes all areas of the lens outside of the optical zone or zones 35. The grooves 12 are useful in this region, among other reasons, to accommodate flexing which tends to occur while putting the glasses on or taking them off.

Preferably, the grooves 12 will be distributed in a manner which minimizes interference with the principal optical zone 35 of the lens 10 or lenses in a dual lens system. Thus, grooving is typically located about the bridge region 24 of the lens 10, and peripherally surrounding the optical zones, such as along the uppermost extremity 20 of the lens 10 and/or along the bottom and sides of the lens 10. See FIGS. 1, 2 and 11 through 16. Grooving in the area of earstem attachment is preferably also provided, to minimize local stress buildup. Preferably, the bottom extremity 22 of the lens 10 is left free of grooving because the bottom extremity 22 of the lens 10 in many lenses is within the range of vision of the wearer.

Figure 5:
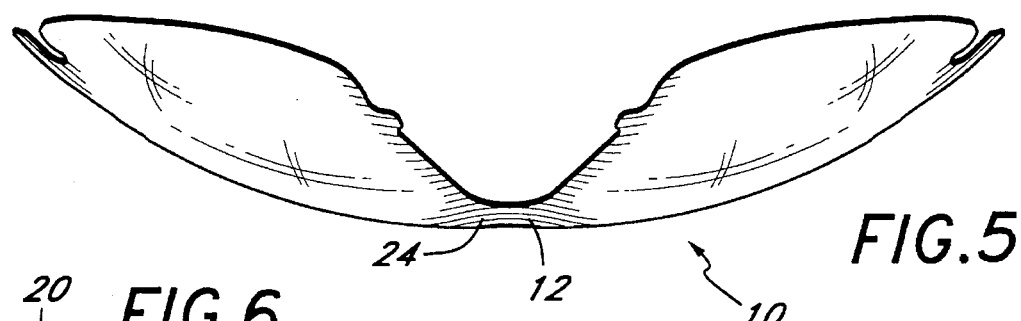
FIG. 5 is a bottom plan view of the lens of FIG. 1.
Figure 6:
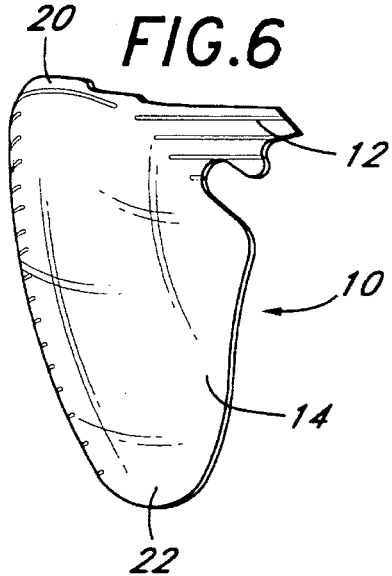
FIG. 6 is a side elevational view of the lens of FIG. 1.
Figure 13:
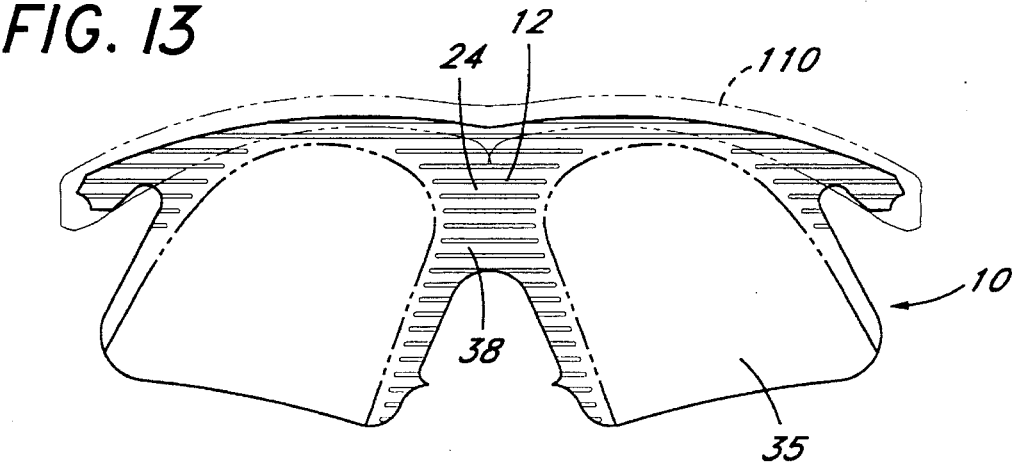
FIG. 13 is a front elevational view of another alternative embodiment of the grooves of the present invention on a unitary lens with an upper frame shown in phantom.
Figure 14:
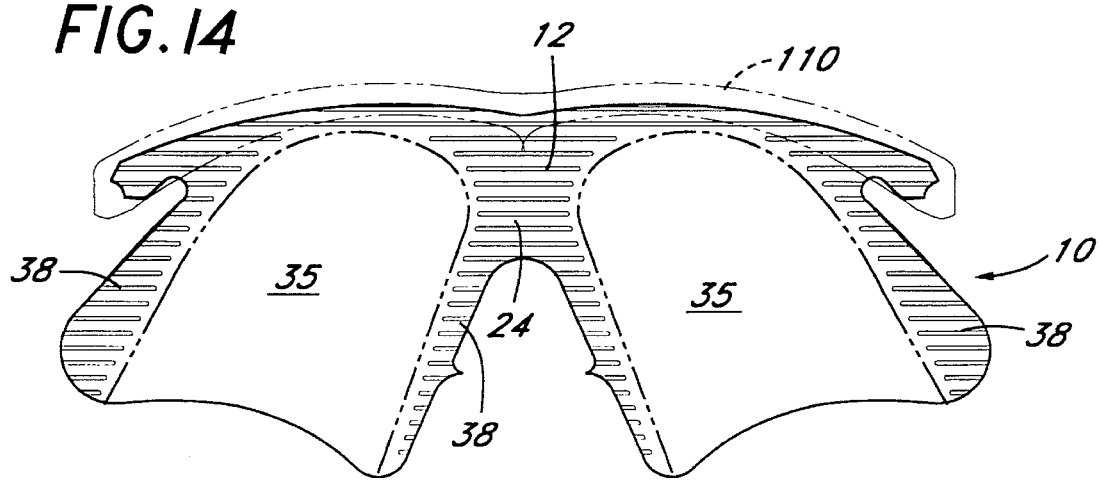
FIG. 14 is a front elevational view of another alternative embodiment of the grooved lens of the present invention with an upper frame shown in phantom.
Figure 15:
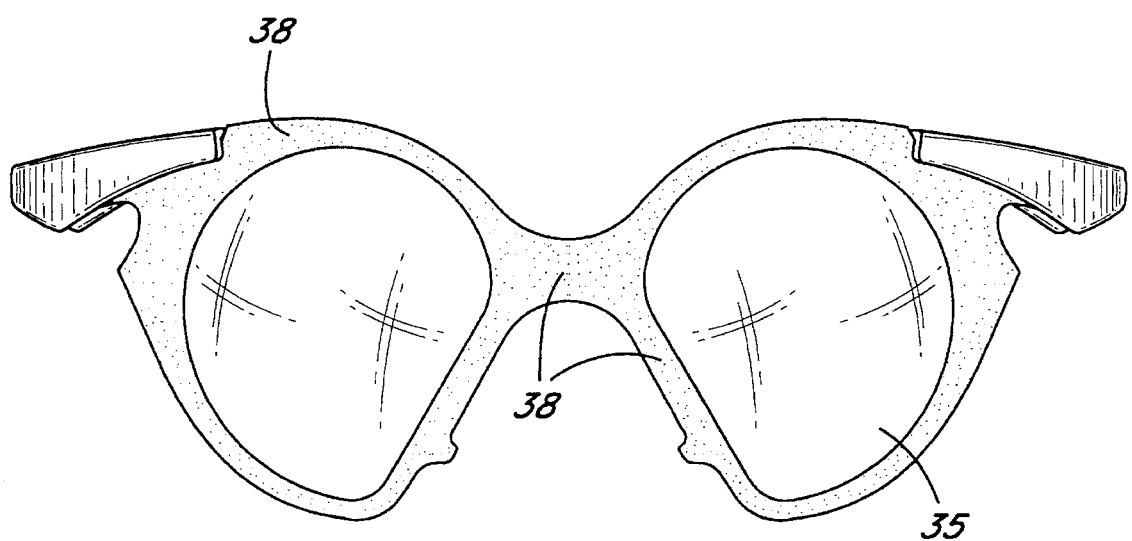
FIG. 15 is a front elevational view of another embodiment of the grooved lens of the present invention.

As shown throughout the figures, the grooves 12 may be placed on the lens 10 in any of a variety of patterns. The grooves shown in FIGS. 1, 2 and 5 have a generally parabolic configuration, while the grooves shown in FIGS. 11 and 12 radiate linearly from a common focus located above the bridge portion 24 of the lens 10. Referring to FIGS. 13 through 14, the grooves 12 on the lens 10 are linear in a horizontal direction and parallel to each other. The large, generally flat bottomed groove of FIG. 15 continuously covers essentially the entire peripheral zone. Although several configurations of grooves are shown in the figures, virtually an infinite number of groove configurations may be provided to achieve the advantages of the present invention.

The grooves 12 in accordance with the present invention may be produced in any of a variety of ways for removing material from the surface of the lens that will be understood by one of skill in the art. For example, surface grooves can be provided during the molding process of the lens 10. Alternatively, surface grooves 12 can be provided by a post lens forming operation, such as mechanical milling, slicing, grinding, sand blasting, laser etching or other techniques known in the art. The grooves 12 may also be etched utilizing a pantographing machine, a computer controlled milling machine or other milling machines. For example, the optical zone can be masked utilizing peelable stickers, paintable or sprayable resistent mask material, reusable preformed masks or any of a variety of techniques well known in the art. The exposed portion of the lens is thereafter exposed to a chemical etchant or sand blasted using for example 70–140 U.S. sieve impact beads in a conventional sand blaster/cleaner unit. Particular etchants and bead sizes can be optimized by routine experimentation in view of the disclosure herein.

Figure 7:
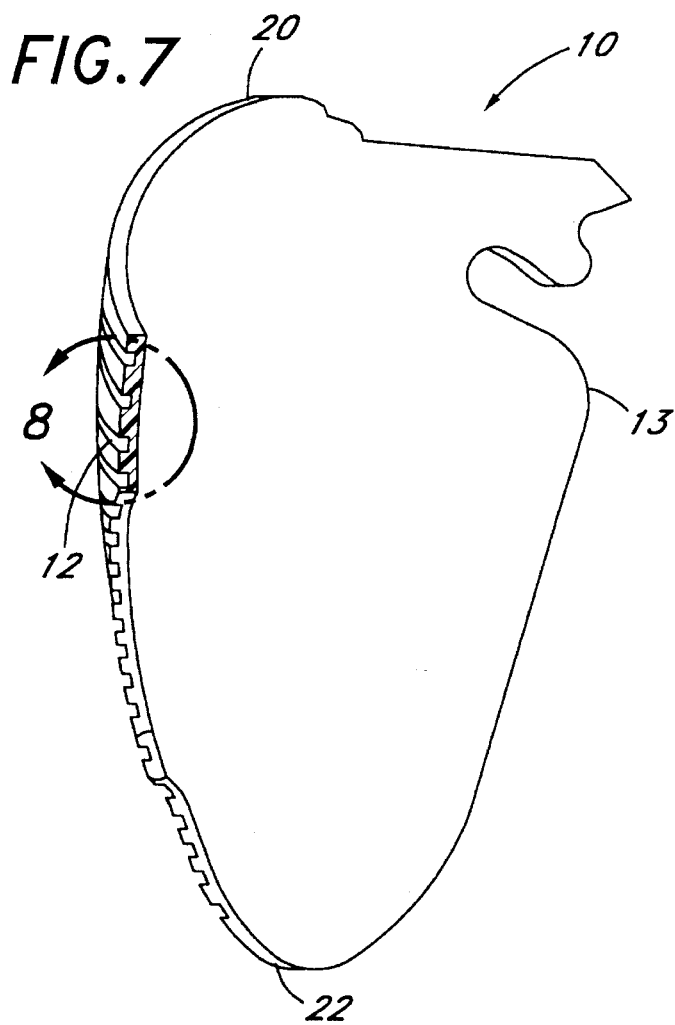
FIG. 7 is a cross-sectional side elevational view taken on lines 7—7 of FIG. 1.

The number of grooves 12 and spacing between the grooves 12 can be varied considerably and still accomplish the advantages of the present invention. In one embodiment of the present invention, referring to FIGS. 7 and 8, the grooves 12 are spaced by a distance D within the range of from approximately 0.050 inches apart to approximately 0.200 inches apart. More preferably, adjacent grooves in a multiple groove embodiment are spaced within the range of approximately 0.060 inches apart to 0.100 inches apart, or less. The grooves 12 need not be equidistant from each other and may overlap.

At least one groove is provided on the surface of the lens in accordance with the present invention. See, e.g., FIG. 15 for a single wide groove embodiment. As will be apparent to one of skill in the art in view of the disclosure herein, "groove" is intended to describe any depression from the native surface of the lens blank produced by the removal of lens material, whether by sawing, etching, sand blasting, grinding or the like. The depth of the groove can range from microns up to the maximum depth which does not undesirably compromise structural integrity in view of the thickness of a particular lens, as will be discussed in the context of particular embodiments below.

The maximum number of grooves is limited only by the desired size of the optical zone 35, and by the desired minimum dimensions of the groove. In general, for grooves of the type illustrated in FIGS. 1–14, at least about 5 and preferably more than about 10 nonintersecting grooves with be provided. In the embodiment illustrated in FIG. 1, wherein grooves are provided along the nosepiece attachment surface, at least about 20 nonintersecting grooves are spaced apart along a generally vertical line through the glasses. Alternatively, in the embodiment illustrated in FIG. 11, at least about 33 discrete grooves are provided in a radiating fashion. By closer spacing of appropriately dimensioned grooves, as many grooves as 50 or 100 or more can readily be provided in accordance with the present invention, yet not unduly interfering with the principle optical zone. As the number of grooves for any given groove width reaches a certain upper limit, the grooves become indistinguishable and assume the appearance of the single broad groove embodiment such as that illustrated in FIG. 15.

Figure 8:
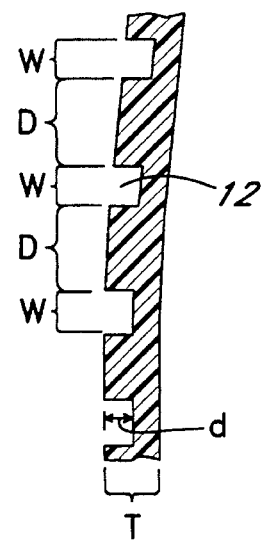
FIG. 8 is an enlarged cross-sectional view of the lens of FIG. 1 taken on lines 8—8 of FIG. 7.
Figure 9:
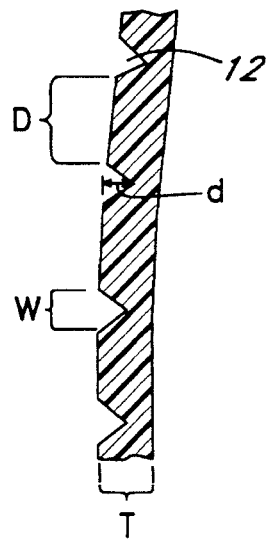
FIG. 9 is an alternative embodiment of the grooves shown in FIG. 8.
Figure 10:
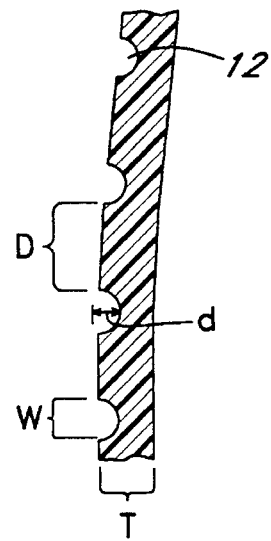
FIG. 10 is an alternative embodiment of the grooves shown in FIG. 8.
Figure 11:
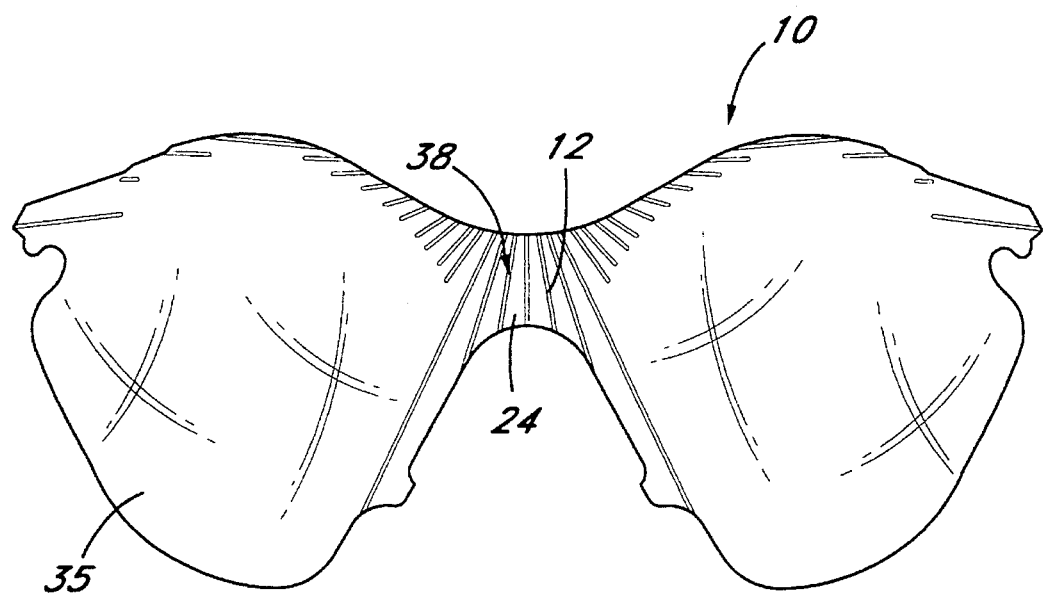
FIG. 11 is a front elevational view of an alternative embodiment of the grooves of the present invention on a unitary lens.
Figure 12:
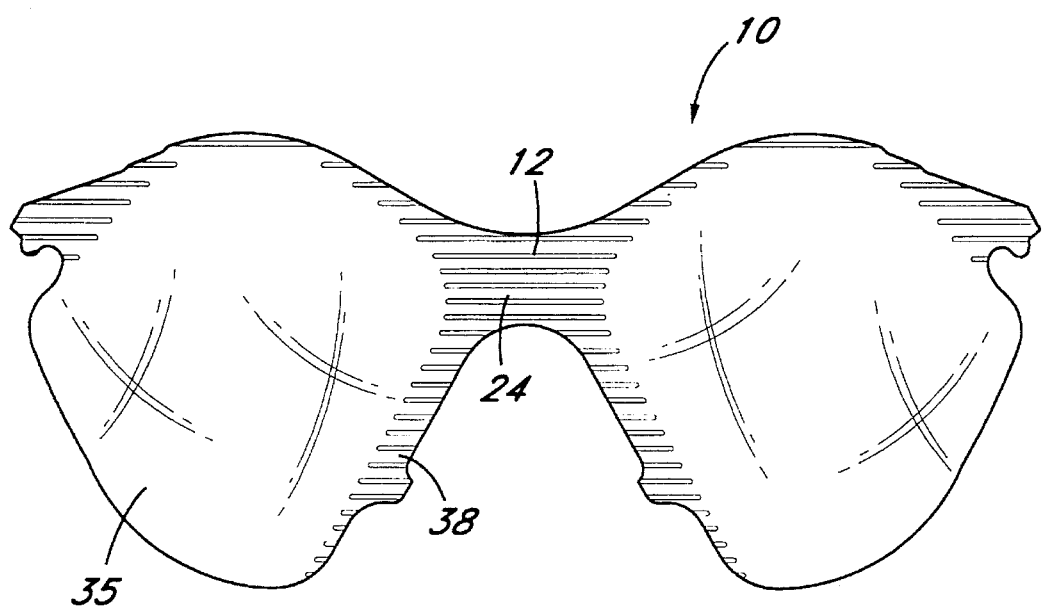
FIG. 12 is a front elevational view of another alternative embodiment of the grooves of the present invention on a unitary lens.

Referring to FIG. 8, the width w at the opening of the groove 12 and depth d of the groove 12 may also be varied considerably and still accomplish the objectives of the present invention. Preferably, the width w of the groove in this embodiment is no more than about 1/8 of an inch, and more preferably, no more than about 1/16 of an inch. Grooves 12 having a width w of 1/32 of an inch or 1/64 of an inch or less may also readily be used, depending upon the method utilized to produce the groove 12. Hairline grooves of relatively small width w, such as in the 100ths or 1000ths of an inch may also be used to accomplish the advantages of the present invention.

The depth d at the deepest point of the groove 12 is limited at its maximum by the thickness of the lens blank and the desired structural integrity of the finished lens 10. For example, a typical unitary lens injection molded from polycarbonate will have a thickness T within a range of from about 0.05 inches to about 0.08 inches. In a preferred embodiment, the central region of the lens has a thickness T of about 0.066 inches. In this embodiment, the grooves 12 will typically have a depth d of no more than about 0.03 inches and, preferably no more than about 0.02 inches or less.

The grooves 12 of the present invention may also be provided in a variety of cross-sectional configurations. For example, referring to FIGS. 8 through 10, the grooves 12 can be flat bottomed (FIGS. 8 and 15), v-shaped (FIG. 9), or half-round (FIG. 10), or any of a variety of other configurations as desired. In general, groove configurations with at least some slight rounding are preferred because they minimize localized buildup of stress which tends to become focused at sharply defined angles.

Preferably, grooves having a rounded bottom V-groove cross-sectional configuration are preferred in order to maximize the decrease in surface tension of the lens 10 and the decrease in static electricity of the lens 10.

It is contemplated by the present invention that a single lens 10 may contain a plurality of grooves of varying width w, depth d and cross-sectional configuration, as well as varying distances D between the grooves 12, as discussed above.

It is believed by the present inventors that the provision of the grooves 12 on either the convex outer surface of the lens or the concave inner surface of the lens decrease the surface tension of the lens and therefore may increase the impact resistance of the lens 10. Further, the grooves 12 on the convex outer surface of the lens 10 may decrease the static electrical charge of the lens 10 in areas which are distanced from the grooves 12. In other words, it is not necessary to provide grooves throughout the entire lens 10 in order to achieve the advantages described herein.

Thus, the area of the lens which is provided with grooves may comprise less than 20% of the surface area of the lens and, possibly, less than about 10% of the surface area of the lens to still benefit from the static discharge feature. In some embodiments, less than about 3 or 4% of the surface area of the lens is provided with grooves, provided that the grooves are positioned in high stress areas, such as at the attachment of the earstems, and at the bridge region 24 between the optical zones of the left and right eye of the wearer. Most preferably, grooves 12 are provided in the area of the earstem attachment zone, the bridge region 24, and along the zone extending downward adjacent the nose of a wearer, as illustrated in the figures.

In accordance with the aesthetic and peripheral light blocking features of the foregoing embodiment, a single wide groove may be provided having a substantially flat bottom, and a width sufficient to optimize the light interception characteristics of the lens. For example, the peripheral zone 38 of any of the embodiments illustrated in FIGS. 1 through 14 discussed supra can be provided with a single groove extending the width of the peripheral zone 38 instead of multiple grooves therein.

The single groove embodiment thus contemplates an eyeglass lens having a profile in which the optical zone of the lens has a native surface level or thickness, and the peripheral zone of the lens, which is essentially the flat bottom of a wide groove, has a somewhat reduced surface level or thickness due to the removal of some material from the surface of the lens. The visual effect of the single, wide groove is to produce a lens having a central optical zone and a peripheral sand blasted or etched light intercepting zone which gives the appearance of an outer frame, yet without any additional weight. See FIG. 15.

In accordance with a further aspect of the present invention, there is provided a lens having a central optical zone 35 surrounded partially or completely by a peripheral zone 38 which has been modified by the addition of material to the native surface of the lens. In the previous embodiments of the invention, the surface modification to the peripheral zone 38 has been accomplished by removing material from the native surface of the lens, such as by milling, laser cutting, etching or the like for narrow grooves or processes such as "sand" blasting of the peripheral zone following masking of the optical zone.

In the new embodiment of the invention, a more versatile look can be achieved by applying material to the surface of the lens to build the peripheral zone up rather than recess the peripheral zone relative to the native surface of the optical zone. The surface modification by application of additional material is accomplished in a generally similar manner than the previous etching of material from the lens. In particular, the lens blank is cut or otherwise formed into the desired configuration and the optical zone is masked. Masking may be accomplished by applying a material to the optical zone which is removable following the treatment of the peripheral zone, and which would prevent the treatment of the peripheral zone from impairing the optical quality of the optical zone. One convenient mask is simply an adhesive sticker which has been cut to the desired configuration of the optical zone.

Following masking, the peripheral zone is exposed such as by spraying to a stream of coating material which will produce a textured build up of the surface of the lens. The spraying may be accomplished in any of a variety of manners well known in the art, depending upon the viscosity, droplet or mist size, carrier composition, particle size and other properties of the coating material.

Although any of a wide variety of coating materials can be formulated by one of skill in the art in view of the disclosure herein, the coating material generally comprises at least a particulate and a carrier. A particulate may comprise any of a variety of materials or mixtures of materials such as metal or polymeric powder of fragments. For example, a fine mesh powder having a particulate size roughly in the 25–500 micron range can produce a relatively uniformed fogged or etched look similar to that achievable by sand blasting. In one embodiment, a particulate size in the 50–100 micron range is used. Alternatively, larger particles will produce a deeper topography on the surface of the peripheral zone, and irregular particles such as rod shapes, rhomboids, cubes or other geometric shapes or mixtures thereof can produce an interesting appearance as well as achieve the objective of reducing light transmission through the peripheral zone of the lens.

The particulate is preferably mixed or suspended in a carrier which may comprise any of a variety of formulations devisable by one of ordinary skill in the art. The carrier can be an adhesive material, such as to produce adhesion between the particulate and the lens surface. Alternatively, the carrier can comprise a solvent or other volatile material in which the lens and the particle are dissolvable or softenable to produce a chemical bonding between the particulate and the surface of the lens. The particular solvent or adhesive to be used will be readily known to those of ordinary skill in the art depending upon the material of the lens and the composition of the particulate.

A variety of artistic and functional designs can be produced using a combination of the etched surface and raised surface embodiments of the present invention. In general, the etched and raised surfaces will be positioned outside of the desired optical zone of the lens, and can extend over only a portion or portions of the peripheral zone or the entire peripheral zone as has been previously discussed.

As with all other embodiments of the present invention, surface modifications on the lens, either by etching, sand blasting, milling, grinding, spraying or other technique can be utilized to modify portions or all of the peripheral zones on lenses having any of the known configurations. For example, lenses can be either unitary (extending across or into the field of view of both eyes) or dual lens systems (separate lens for each eye). The lenses can be formed from any of a variety of lens blank configurations, as discussed in detail below, including spherical, toroidal, cylindrical, frustroconical, or the like. In general, the lens or lenses can be formed in a manner that conforms to the surface of any of a wide variety of geometric solid shapes. The lens can be produced using any of the techniques available in the art such as injection or other molding, thermoformay, grinding and the like.

In one unitary lens embodiment of the present invention, as shown in FIG. 1, the lens 10 is adapted to extend in an arc from a left extremity 13 to a right extremity 14 substantially throughout the wearer's entire field of vision. A horizontal arc length $L_h$ is defined as the horizontal length along the surface of the lens. The arc horizontal length $L_h$ Of the lens 10 is preferably within the range of from about 3.0 or 4.5 inches to about 7.5 or 8 or 9 inches, and, more preferably, within the range of from about 5 inches to about 7 inches. In the vertical direction, the lens 10 can be either linear or curved as is discussed below.

Figure 16:
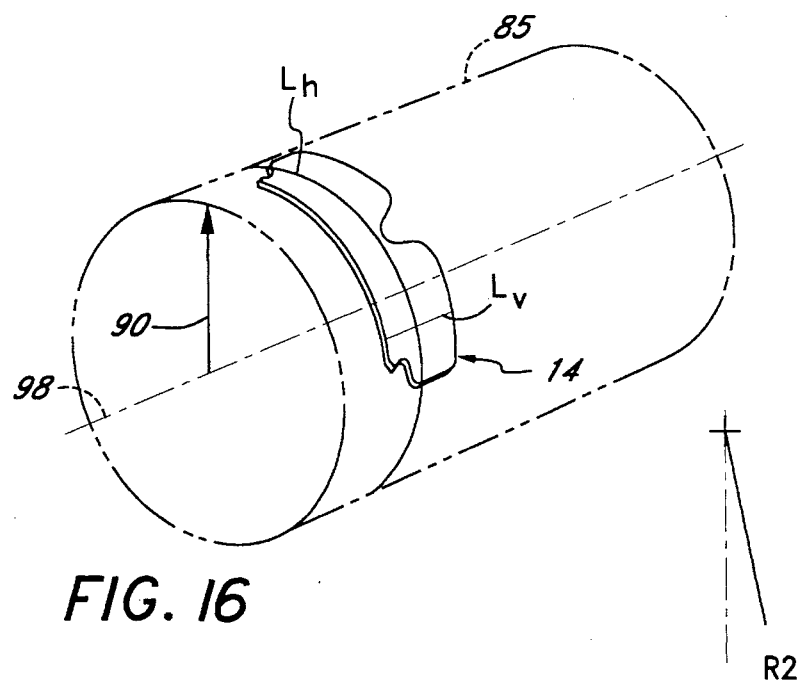
FIG. 16 shows a lens in accordance with the present invention conforming to the surface of a cylinder.

FIG. 16 depicts a unitary lens blank for use with the present invention substantially conforming to the exterior surface of a cylinder 85. The benefits derived from the use of a cylindrically shaped unitary lens are expounded in U.S. Pat. No. 4,859,048, which is incorporated herein by reference. Thus, one embodiment of the lens 10 of the present invention is preferably provided with a substantially uniform curve, such that a line $L_h$ (FIG. 16) drawn along the surface of the lens 10 in a circumferential direction defines an arc of substantially uniform radius 90. A line $L_v$ drawn along the surface of the lens 10 in an axial direction is substantially parallel to the axis 98 of the cylinder 85.

Although a variety of radii might accrue the advantages of the present invention, the lens is preferably provided with a radius 90 within the range of from about 2½ to about 4½ inches, and preferably within the range of from about 3½ to 4 inches. The foregoing radius dimensions represent the distance from the axis 98 to the interior, concave surface of the lens.

Figure 17:
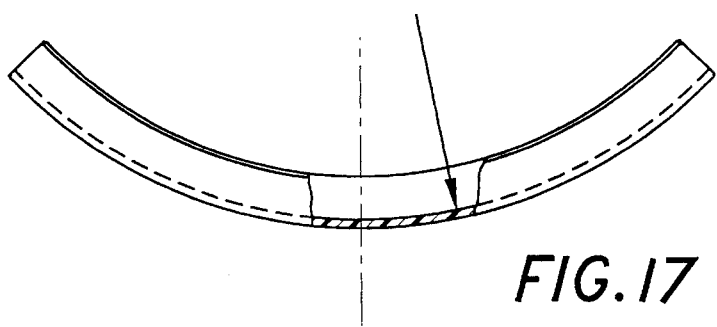
FIG. 17 is a top plan view of a toroidal lens in accordance with the present invention.
Figure 18:
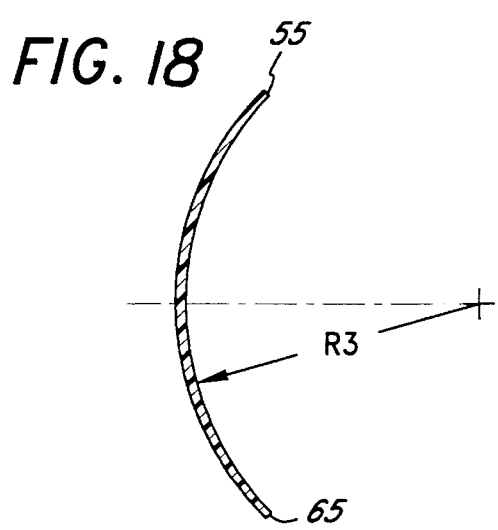
FIG. 18 is a side elevational view of a toroidal lens or a spherical lens in accordance with the present invention.

The lens 10 of the present invention may alternatively be curved along each of two substantially perpendicular axes to produce a lens, for example, which conforms to the surface of either a sphere or a generally toroidal configuration. Thus, a cross-section of the lens taken along a horizontal plane (FIGS. 19 and 20) midway from the bottom edge 65 of the lens to the top edge 55 (See FIG. 18) will reveal an arcuate cross-sectional configuration, characterized by a first radius dimension $R_2$ as shown in FIG. 17. Unlike the cylindrical lens, however, a vertical cross-section through the lens reveals a curvature from the top edge 55 to bottom edge 65 characterized by a second radius dimension $R_3$, as shown in FIG. 18. Where $R_2$ equals $R_3$, the lens will conform to the surface of a sphere. $R_2$ can also be less than or greater than $R_3$. Toroidal lenses in which $R_2$ is less than $R_3$ are the subject of U.S. Pat. No. 4,867,550 which is incorporated herein by reference.

The lens of the present invention has sufficient thickness that it is not accurately defined as having only a single radius. Instead, referring to FIG. 19, the lens 10 has a thickness or depth dimension 93 along its entire arc length which causes the arc defined by the outer, convex surface 95 to have a separate radius $R_1$ from the radius $R_2$ defined by the inner, concave surface 97 of lens 10. In an embodiment where the lens is of substantially uniform thickness throughout, and the axes are coincident, the radius $R_1$ of the convex surface 95 is essentially equal to the sum of the radius $R_2$ of the concave surface 97 and the depth 93 of the lens. See FIG. 20.

In accordance with another embodiment of the present invention, there has been provided a unitary lens substantially as any of those described above, with one following modification. Referring to the horizontal sectional view illustrated in FIG. 19, there is disclosed a lens 10 defined between an outer convex surface 95, having a radius $R_1$, and an inner concave surface 97, having a radius $R_2$. The principal difference from the previously detailed embodiment is that the thickness of the lens 10 at each of the distal ends 80 and 83 is less than the average thickness of the lens at every point intermediate the two distal ends 80 and 83. In addition, the thickness of lens 10 measure at least one point intermediate the two ends 80 and 83 is greater than the thickness at each of those ends.

Figure 19:
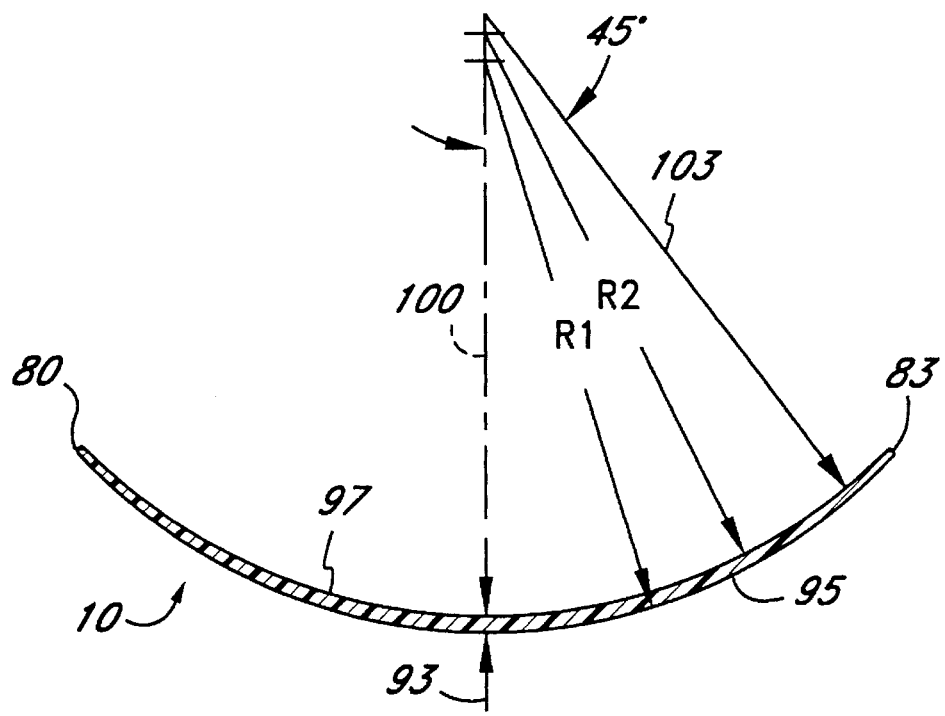
FIG. 19 is a horizontal cross sectional view of a lens in accordance with the present invention, having a tapered thickness.
Figure 20:
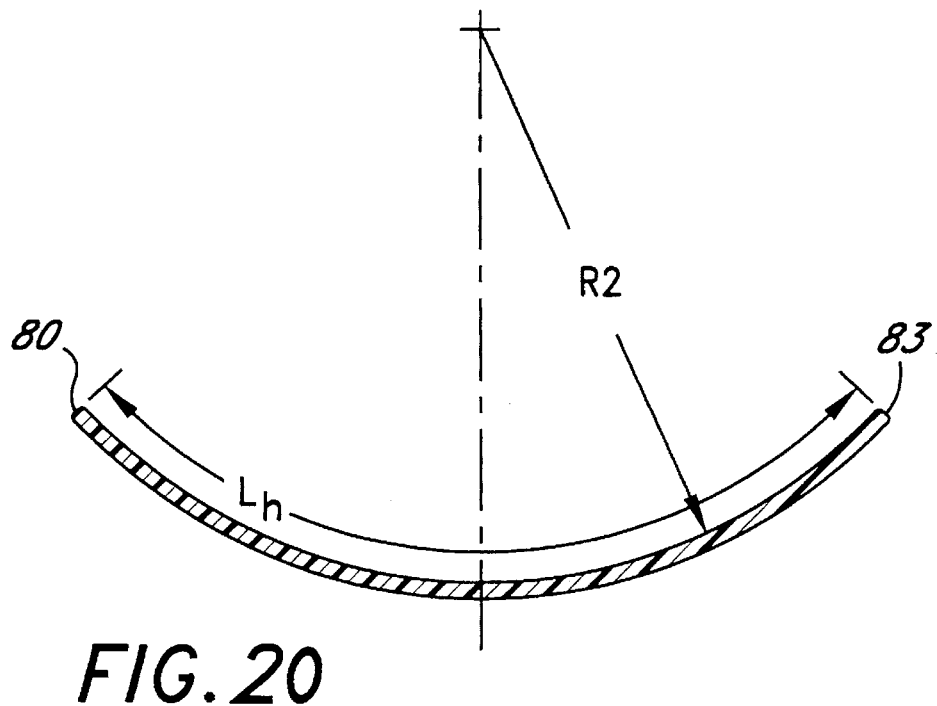
FIG. 20 is a horizontal cross sectional view of a lens in accordance with the present invention having a substantially uniform thickness throughout.

The invention can best be understood by reference to FIG. 19, which illustrates the relationship between the lens thickness and angular position along the arc length of a lens. Since the arc length $L_h$ of a lens can be varied considerably, although it is preferably within the range of from about 5½ to 7 inches, reference points will arbitrarily be selected at the centerline 100 and at the 45° line 103. Since the distance from centerline 100 to reference line 103 is ⅛ of 360°, the reference arc length for a radius of 3 inches is about 4.7 inches, which is within the preferred range, thus defining a reference point on the lens.

In accordance with the tapered lens embodiment of the present invention, the thickness of the lens at reference line 103 is preferably from about 40% to about 99% of the thickness at centerline 100. Thus, for example, a lens having a centerline thickness 100 of about 0.060 inches will preferably have a thickness of within the range of about 0.024 to about 0.059 inches at reference line 103, and a thickness near the distal end 83 of the lens within the range of about 0.020 to about 0.055 inch. The thickness of the lens at the midpoint is preferable within the range of from about 0.055 to about 0.070 inch. In a tapered lens embodiment which has been molded or punched for receiving a lens insert 29, the thickness of the lens insert will typically be substantially greater, as has been discussed.

Preferably, the thickness of the lens tapers at a substantially even rate from the widest region which is centered about the centerline 100, to narrower regions near each of the distal ends 80 and 83. In this manner, optical distortion is minimized. By even rate it is meant that the taper results from the convergence of an arc defining the outer convex surface 95 of lens 10, and an arc defining the inner concave surface 97 of lens 10, each arc characterized by constant radii $R_1$ and $R_2$, respectively. Although the surfaces need not be perfectly uniform arcs, as in the previously discussed embodiment, conformation of the lens surface to a substantially constant radius curve accrues optical advantages. The foregoing may be accomplished in a variety of ways, such as, for example, by making radius $R_1$ equal to radius $R_2$ and displacing the center points from each other. Alternatively, radius $R_1$ may be greater or lesser than radius $R_2$, so long as the converging geometry results.

In the production lens, of course, the distal ends 80 and 83 are formed well before the continuation of the arcs defining surfaces 95 and 97 converge. In a cylindrical lens produced in accordance with this embodiment, for example, and having a centerline thickness of approximately 0.060 inches, the thickness at a point proximate either distal end 80 or 83 will generally be within the range of from about 0.040 to about 0.055 inch.

Finally, since a portion of the lens 10 near the distal ends 80 and 83 serves primarily to block peripheral light and is likely outside of the wearer's direct line of vision, it is less important that the radius of curvature be constant in this area. Thus, the lens may be provided with a smooth taper only up to a certain transition point intermediate the reference line 103 in FIG. 19 and the distal end 83. From that transition point until the distal end 83, the lens 10 may be provided with a relatively constant thickness or a taper of a different rate. Either the tapered thickness or the constant thickness lenses can thus have gradual or sudden changes in curvature near the lateral sides, while having a central region which generally conforms to one of the solid geometric shapes previously described. For example, a central generally cylinderical section can extend across the front of the glasses while each lateral side curves or angles abruptly in the posterior direction.

A nosepiece (illustrated in phantom in FIG. 1) may be provided, which bounds the pane in the region of the nose opening 45. The nosepiece preferably comprises a relatively soft elastomeric material having a coefficient of sliding friction that increases when the material is wetted. Such a material is preferably hydrophilic, and tends to retain the eyewear in position on the wearer's upper nose area as the wearer perspires or encounters moisture, as during skiing. Also, the preferred material is soft, for comfort. On such material is KRATON G, a product of Shell Oil Company.

Referring to FIG. 1, eyewear embodying the lends of the present invention are provided with a pair of earstems 107, 109. Earstems 107, 109 may be formed from any of a variety of relatively rigid, molded thermoplastic materials which are well known in the art, and may be transparent or dyed any of a variety of colors. Earstems 107, 109 may be pivotably secured to the lateral ends of an upper frame 110 (FIG. 13) or to a frame which also or alternatively bounds the lower edge of the lens (not illustrated). Earstems 107, 109 may also be pivotably secured directly to the lens without the use of a conventional frame.

Referring to FIG. 1, the lens 10 may be manufactured in accordance with any of a variety of techniques known to one of skill in the art. For example, thermoforming, injection molding, lost wax molding, centrifugal molding or other techniques may be utilized. Preferably, the lens is injection molded from an optically transparent material, such as polycarbonate.

The lens 10, in accordance with the present invention, may be further provided with any of a variety of coatings on one or both of the inner concave or outer convex surfaces thereof. For example, any of a variety of reflective coatings, filter coatings for transmitting, absorbing or reflecting particular wavelengths of light, iridescent coatings or scratch-resistant coatings may be provided. Although each of these coatings performs a desirable function on the lens 10, coatings unfortunately also tend to increase the propensity of the lens 10 to accumulate static electricity. Further, these coatings tend to increase the surface tension of the lens 10, therefore making it more brittle. Hence, it is particularly desirable that lenses provided with a coating also be provided with the invention described herein.

Although this invention has been described in terms of certain preferred embodiments, other embodiments that are apparent to those of ordinary skill in the art are also within the scope of this invention. Accordingly, the scope of this invention is intended to be limited only by the appended claims.

What is claimed is:

1. A lens for eyeglasses for participation in active sports, such as biking, skiing and the like, said lens comprising:

a top edge and a bottom edge, the bottom edge having a nose opening therein for mounting the lens on the nose of a wearer and for defining a right and a left lens optical zones;

said lens having an arcuate horizontal cross-sectional configuration, wherein the lens curves across the face of the wearer and extends into both the wearer's left eye and right eye fields of vision;

said lens having an outer convex surface and an inner concave surface, the outer convex surface having a peripheral zone on the lens surrounding said right and left optical zones; and a first groove in said peripheral zone surrounding said right lens optical zone and a second groove in said peripheral zone surrounding said left lens optical zone.

2. A lens as in claim 1, wherein the lens is injection molded.

3. A lens as in claim 1, wherein said first groove extends from the edge of said right optical zone to the outer periphery of the peripheral zone and wherein said second groove extends from the edge of said left optical zone to the periphery of the peripheral zone.

4. A lens as in claim 1, wherein the lens conforms to the surface of a sphere.

5. A lens as in claim 1, wherein the lens conforms to the surface of a toroid.

6. A lens as in claim 1, wherein the lens conforms to the surface of a cylinder.

7. A lens as in claim 1, wherein the lens conforms to the surface of a cone.

8. A method of manufacturing a lens of the type having a central optical zone and a peripheral zone for interception of peripheral light, comprising the steps of:

providing a lens blank having a desired configuration;

identifying at least one optical zone on the lens blank;

identifying at least one peripheral zone on the lens blank, said peripheral zone adjacent said optical zone; and removing material from the surface of said peripheral zone thereby modifying the surface texture of the lens blank in the peripheral zone to reduce light transmission through the peripheral zone.

9. A method as in claim 8, wherein said modifying step further comprises the step of applying a mask to the lens to prevent modification of the optical zone, and thereafter modifying the peripheral zone.

10. A pair of eyeglasses, said eyeglasses being suitable for participation in active sports, such as biking, skiing and the like, comprising:

a frame;

a pair of eyestems pivotably attached to said frame;

a left lens having at least one left optical zone and left peripheral zone and at least one groove in said left peripheral zone completely surrounding said left optical zone, said left lens positioned by the frame within the field of vision of a wearer's left eye; and a right lens having at least one right optical zone and right peripheral zone and at least one groove in said right peripheral zone completely surrounding said right optical zone, said right lens positioned by the frame within the field of vision of a wearer's right eye.

11. A method of manufacturing a lens for eyeglasses, of the type having at least one optical zone and at least one peripheral zone, comprising the steps of:

providing a lens blank;

masking a portion of the lens blank;

removing material from an unmasked portion of the surface of said lens blank; and removing the mask to reveal an optical zone.

12. A method of manufacturing a lens as in claim 11, wherein said removing step comprises impacting an unmasked portion of the surface of the lens with impact beads.

* * * * *